(12) United States Patent
Worth et al.

(10) Patent No.: US 8,721,880 B2
(45) Date of Patent: May 13, 2014

(54) DEVICE FOR USE WITH FLOOR DRAINS

(71) Applicant: Aromatic Drain Device, Inc., Raleigh, NC (US)

(72) Inventors: Thomas Worth, Raleigh, NC (US); Mark Mangrum, Raleigh, NC (US); Paul Bradley Forrest, Cary, NC (US); Justin R. Nifong, Cary, NC (US)

(73) Assignee: Aromatic Drain Device, Inc., Raleigh, NC (US)

( * ) Notice: Subject to any disclaimer, the term of this patent is extended or adjusted under 35 U.S.C. 154(b) by 0 days.

(21) Appl. No.: 13/778,177

(22) Filed: Feb. 27, 2013

(65) Prior Publication Data

US 2013/0240424 A1    Sep. 19, 2013

Related U.S. Application Data

(63) Continuation of application No. 13/419,402, filed on Mar. 13, 2012, now Pat. No. 8,409,433.

(60) Provisional application No. 61/477,187, filed on Apr. 20, 2011, provisional application No. 61/510,540, filed on Jul. 22, 2011, provisional application No. 61/544,037, filed on Oct. 6, 2011.

(51) Int. Cl.
    *C02F 1/68*    (2006.01)

(52) U.S. Cl.
    CPC .................................. *C02F 1/68* (2013.01)
    USPC ............... 210/163; 210/164; 422/255; 4/294

(58) Field of Classification Search
    CPC ............................................... C02F 1/68
    USPC ............. 422/255; 210/163, 164; 4/286, 289, 4/292, 294
    See application file for complete search history.

(56) References Cited

U.S. PATENT DOCUMENTS

| | | | | |
|---|---|---|---|---|
| 852,044 | A | * | 4/1907 | Van Der Minden ............... 4/291 |
| 2,101,978 | A | * | 12/1937 | Boosey ........................ 210/300 |
| 7,704,386 | B2 | * | 4/2010 | Ventura ........................ 210/163 |
| 2007/0262006 | A1 | * | 11/2007 | Worth ........................... 210/164 |
| 2010/0012613 | A1 | * | 1/2010 | Anson et al. ................. 215/228 |

* cited by examiner

*Primary Examiner* — Sean E Conley
(74) *Attorney, Agent, or Firm* — NK Patent Law, PLLC

(57) ABSTRACT

A device configured for being received within a floor drain is provided. The device includes a basket assembly containing a liquid-soluble treatment material therein. A drain cover defines an opening that receives the basket assembly. A basket assembly lid defines at least one aperture for allowing flow of liquid into the basket assembly, the basket assembly includes a flange for cooperatively engaging a recess defined in the drain cover to thereby engage the lid with the drain cover.

17 Claims, 13 Drawing Sheets

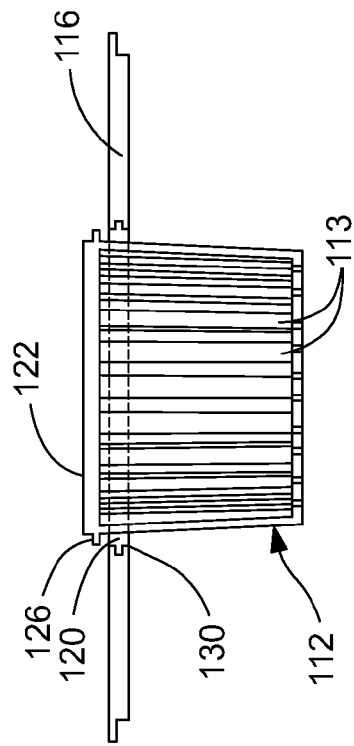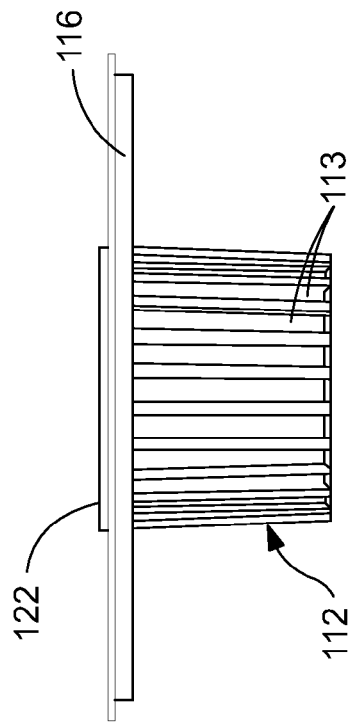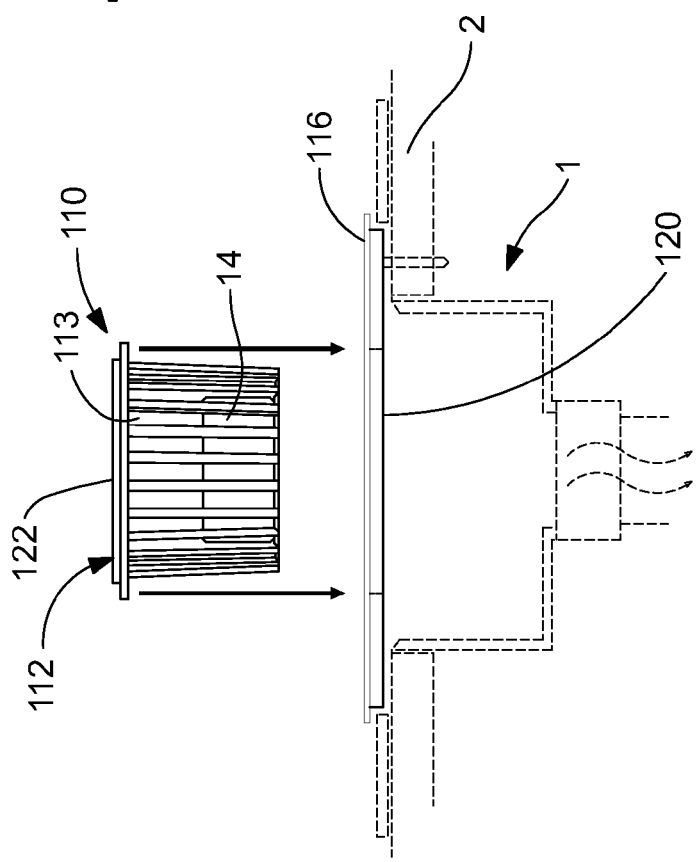

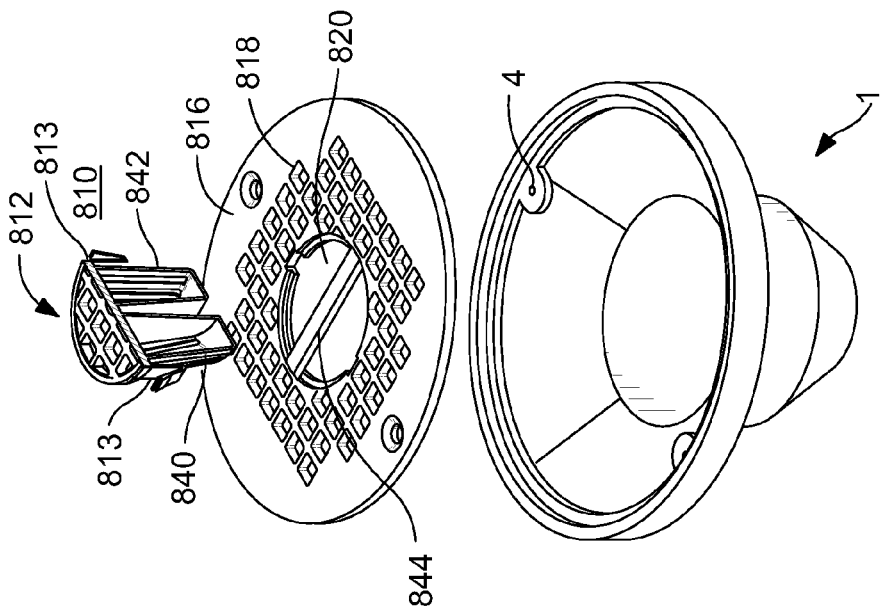
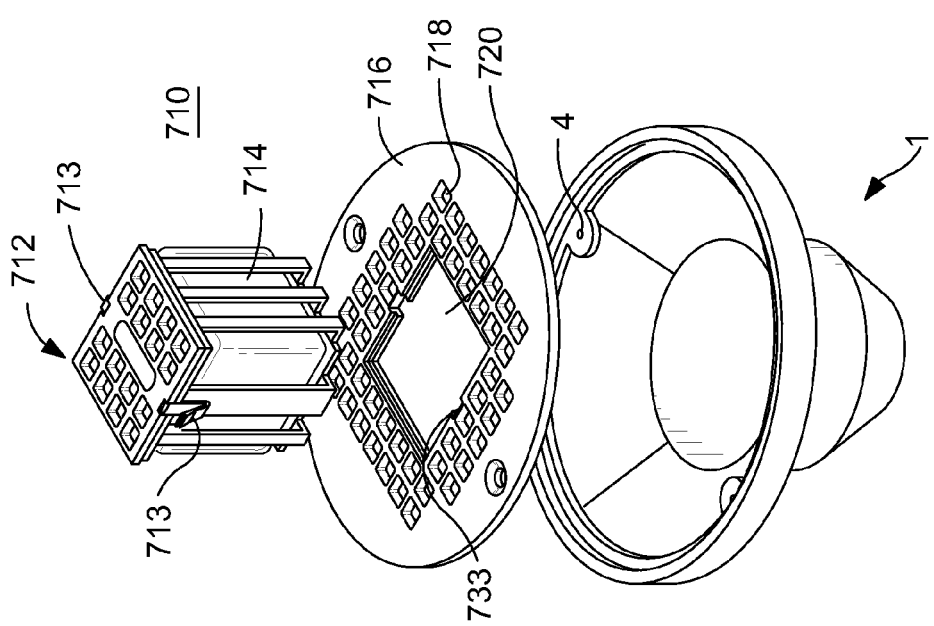

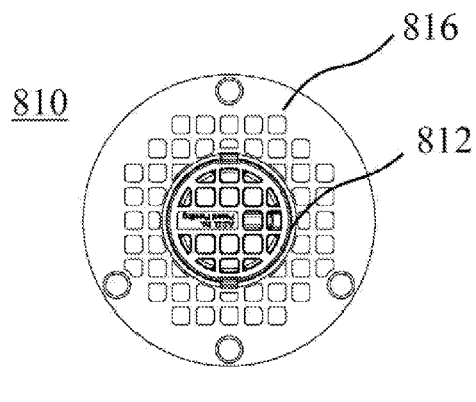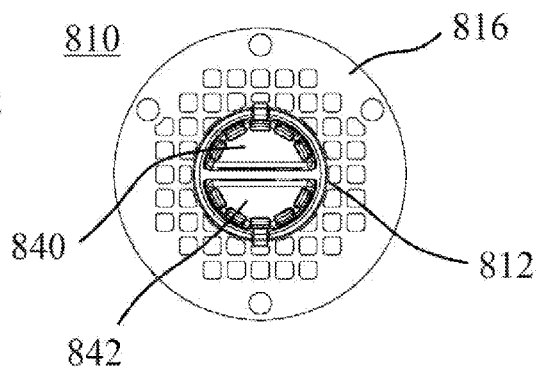
Figure 16D        Figure 16E
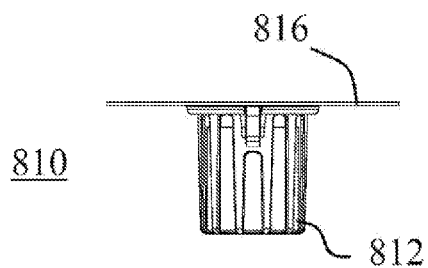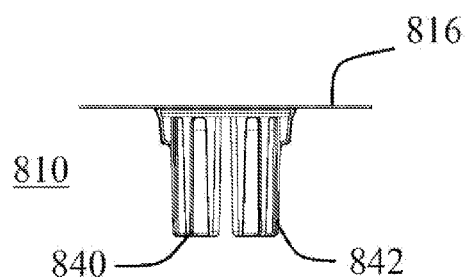
Figure 16F        Figure 16G
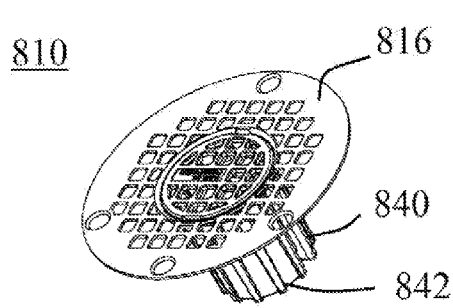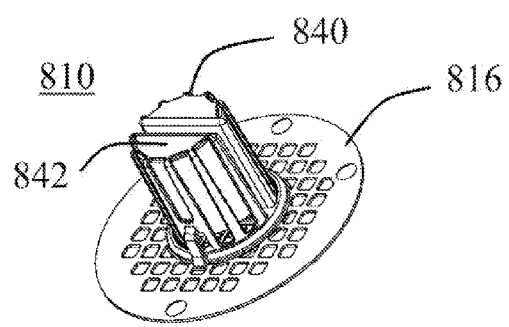
Figure 16H        Figure 16I

DEVICE FOR USE WITH FLOOR DRAINS

CROSS-REFERENCE TO RELATED APPLICATIONS

This application is a continuation application of U.S. Utility application Ser. No. 13/419,402 filed on Mar. 13, 2012, which claims priority to U.S. Provisional Application No. 61/477,187 filed on Apr. 20, 2011, U.S. Provisional Application No. 61/510,540 filed on Jul. 22, 2011, and U.S. Provisional Application No. 61/544,037 filed on Oct. 6, 2011, the entire contents of all of which are hereby incorporated by reference herein. The following applications are directed towards similar subject matter: U.S. Utility application Ser. No. 13/419,326 filed Mar. 13, 2012, U.S. Utility application Ser. No. 13/419,339 filed Mar. 13, 2012, U.S. Utility application Ser. No. 13/419,342 filed Mar. 13, 2012, and U.S. Utility application Ser. No. 13/452,090 filed Apr. 20, 2012, the entire contents of which are hereby incorporated by reference.

TECHNICAL FIELD

The presently disclosed subject matter is directed towards a device, and more particularly, towards a device for being received within a floor drain and containing a liquid-soluble treatment material.

BACKGROUND

Many public facilities have floor drains that suffer from odor and clogging related problems in which odors emanate from the collection of waste, grease, and other elements being trapped in the floor drain. This problem is especially prevalent in kitchens and public restrooms, both residential and commercial. As facilities are cleaned, dirt, grime, and bacteria collect in the floor drain trap, commonly referred to as a p-trap because of the shape of the piping connected therewith. The water in the p-trap quickly becomes dirty and may emanate a foul odor into the room and adjacent areas.

Currently, the prevailing solution to this problem is the use of sanitizing liquids, deodorants, or degreasers being poured down the drain. These liquids are typically poured down the floor drain on a regular basis. However, the solution is quickly washed down the drain and out of the p-trap with subsequent cleanings. Additionally, the sanitizing liquid does not provide continuous aroma to the room. The buildup of organic material and grease requires pumping of grease out of the trap or other holding container.

Other common solutions include the use of wall-mounted, time-release deodorizer sprayers. These devices systematically release aroma into the room to mask odors at predetermined time intervals. These systems also have the disadvantage of failing to continuously release aroma into the room. While these devices mask foul odors immediately following discharge, the active aromatic agents quickly disperse into the room, failing to effectively mask or eliminate the odors.

Yet other devices attempt to place deodorizing and sanitizing agents inside the drain. These devices typically address either sink drains or floor drains. Most of these devices require special drain modifications to hold the device, increasing expense to the owner and making them impractical for contractor installation. These devices may also have the tendency to aggravate drain problems by catching dirty water around the device.

These devices also suffer from the disadvantage that they do not address any insect or other pest-related issues.

Accordingly, there remains a need for a device that addresses the various disadvantages associated with previous devices.

SUMMARY

According to one or more embodiments, a device configured for being received within a floor drain is provided. The device includes a basket assembly containing a liquid-soluble treatment material therein. A drain cover defines an opening that receives the basket assembly. A basket assembly lid defines at least one aperture for allowing flow of liquid into the basket assembly. The basket assembly includes a flange for cooperatively engaging a recess defined in the drain cover to thereby engage the lid with the drain cover.

According to one or more embodiments, a device configured for being received within a floor drain cover is provided. The device includes a basket assembly containing a liquid-soluble treatment material therein and a basket assembly lid defining at least one aperture for allowing flow of liquid into the basket assembly. The basket assembly includes a flange for cooperatively engaging a recess defined in the drain cover to thereby engage the lid with the drain cover.

According to one or more embodiments, a device configured for being received within a floor drain is provided. The device includes a basket assembly containing a liquid-soluble treatment material therein and a basket assembly lid fixedly secured to the basket assembly and defining at least one aperture for allowing flow of liquid into the basket assembly. A floor drain cover defines an opening that receives the basket assembly. The basket lid is configured for selective engagement with the drain cover to thereby engage the basket assembly with the drain cover.

According to one or more embodiments, a device is provided. The device includes a basket assembly configured for containing a liquid-soluble treatment material therein and a skirt for covering the perimeter of a floor drain and defining an opening therein for receivably engaging the basket assembly.

According to one or more embodiments, the basket assembly further defines a shoulder configured for engaging with a cooperative groove formed in the skirt.

According to one or more embodiments, the basket assembly further defines an arm configured for engaging with a cooperative groove formed in the skirt.

According to one or more embodiments, the basket assembly further defines a support to which the liquid-soluble treatment material is carried by.

According to one or more embodiments, the basket assembly defines a plurality of openings on a top portion thereof for allowing flow-through of liquid.

According to one or more embodiments, the skirt defines a plurality of openings for allowing flow-through of liquid.

According to one or more embodiments, the skirt defines a ledge upon which the basket assembly rests when selectively engaged therewith.

According to one or more embodiments, the device includes the liquid-soluble treatment material carried within the basket assembly. The liquid-soluble treatment material is configured as one of a pesticide, insecticide, fragrance, and a degreaser.

According to one or more embodiments, the basket assembly defines at least two vessels. Each vessel is configured for containing one of the liquid-soluble treatment materials.

According to one or more embodiments, the basket assembly defines a plurality of openings on a top portion thereof for allowing flow-through of liquid and the skirt defines a plurality of openings for allowing flow-through of liquid. The basket assembly and the skirt cooperatively forming a floor drain cover.

According to one or more embodiments, the basket assembly further defines a lid for allowing access to the liquid-soluble material.

According to one or more embodiments, the lid is hingedly connected to a base of the lid.

According to one or more embodiments, the liquid-soluble treatment material is carried by a support that is configured for engaging with the lid.

According to one or more embodiments, the device includes an electric fan at a bottom portion of the basket assembly for providing airflow through the basket assembly.

According to one or more embodiments, a device is provided. The deice includes a skirt for covering the perimeter of a floor drain and defining a basket assembly configured for being received in the floor drain opening and a lid configured for selectively engaging a top portion of the basket assembly to thereby form an enclosure for containing a liquid-soluble treatment material therein.

According to one or more embodiments, the lid defines a plurality of openings on a top portion thereof for allowing flow-through of liquid.

According to one or more embodiments, the skirt defines a plurality of openings for allowing flow-through of liquid.

According to one or more embodiments, the lid and the skirt define a plurality of openings for allowing flow-through of liquid, the skirt and the lid cooperatively forming a drain cover.

According to one or more embodiments, a basket assembly configured for containing a liquid-soluble treatment material therein is provided. The basket assembly includes a fastener configured for engaging the basket assembly with an opening defined in a skirt for covering the perimeter of a floor drain. The opening is generally concentric with the floor drain opening.

According to one or more embodiments, the liquid-soluble treatment material is one of a pesticide, insecticide, fragrance, and a degreaser According to one or more embodiments, a tool for use with a basket assembly is provided. The basket assembly is of the type configured for being receivably engaged with an opening defined in a drain cover skirt for covering the perimeter of a floor drain. The tool is configured for engaging the basket assembly and removing the basket assembly from the drain cover skirt upon force input from a user.

According to one or more embodiments, the basket assembly defines an arm configured for engaging with a cooperative groove formed in the skirt. The arm has a first position in which the arm is engaged with the groove of the skirt thereby securing the basket into the floor drain skirt and a second position in which the arm is bent away from the groove to allow removal of the basket assembly.

According to one or more embodiments, the tool includes shoulders configured for imparting movement to the arm into the second position to allow removal of the basket assembly.

According to one or more embodiments, the tool includes a hook member that is configured for being received in an opening of the basket assembly and engaging therewith for removing the basket assembly from the drain cover skirt upon force input from the user.

According to one or more embodiments, the tool includes one or more openings for receiving the user's fingers.

According to one or more embodiments, the tool further defines a planar nesting surface configured for engaging with a top portion of the basket assembly.

According to one or more embodiments, the tool further defines a planar nesting surface and the shoulders extend from the nesting surface.

According to one or more embodiments, the tool further defines a planar nesting surface and the hook member extends from the nesting surface.

According to one or more embodiments, a method for installation and removal of a basket assembly from a floor drain cover skirt is provided. The method includes using a tool defining one or more shoulders configured for disengaging the basket assembly, extending a portion of the tool into the basket assembly to disengage the basket assembly, and applying forces to the tool to impart movement of the basket assembly relative to the floor drain.

According to one or more embodiments, the basket assembly is of the type configured for being receivably engaged with an opening defined in a drain cover skirt for covering the perimeter of the floor drain.

According to one or more embodiments, the basket assembly defines an arm configured for engaging with a cooperative groove formed in the skirt. The arm has a first position in which the arm is engaged with the groove of the skirt thereby securing the basket into the floor drain skirt and a second position in which the arm is bent away from the groove to allow removal of the basket assembly.

According to one or more embodiments, the tool includes a hook member that is configured for being received in an opening of the basket assembly and engaging therewith for removing the basket assembly from the drain cover skirt upon force input from the user.

According to one or more embodiments, a kit is provided. The kit includes a basket assembly configured for containing a liquid-soluble treatment material therein and being configured to be received in an opening defined in a skirt for covering the perimeter of a floor drain, and a tool for use with the basket assembly. The tool is configured for engaging the basket assembly and removing the basket assembly from the drain cover skirt upon input from the user.

According to one or more embodiments, the basket assembly defines an arm configured for engaging with a cooperative groove formed in the skirt. The arm has a first position in which the arm is engaged with the groove of the skirt thereby securing the basket into the floor drain skirt and a second position in which the arm is bent away from the groove to allow removal of the basket assembly.

According to one or more embodiments, the tool includes shoulders configured for imparting movement to the arm into the second position to allow removal of the basket assembly.

According to one or more embodiments, the tool includes a hook member that is configured for being received in an opening of the basket assembly and engaging therewith for removing the basket assembly from the drain cover skirt.

According to one or more embodiments, the tool includes one or more openings for receiving a user's fingers.

According to one or more embodiments, the tool further defines a planar nesting surface configured for engaging with a top portion of the basket assembly.

According to one or more embodiments, the tool further defines a planar nesting surface and the shoulders extend from the nesting surface.

According to one or more embodiments, the tool further defines a planar nesting surface and the hook member extends from the nesting surface.

According to one or more embodiments, a cover for a drain assembly is provided. The cover includes a skirt material defining a plurality of openings therein for allowing flowthrough of liquid and one or more fasteners extending from the skirt material and configured for being received within an opening defined in the drain assembly.

According to one or more embodiments, the one or more fasteners are each pegs extending from the first skirt material.

According to one or more embodiments, the one or more pegs include one or more detents for being received in cooperatively defined one or more openings of a floor drain skirt in the drain assembly.

According to one or more embodiments, the cover is formed from an injection molding process.

According to one or more embodiments, the injection molding process includes injecting a treatment material into the cover.

According to one or more embodiments, the cover is provided with an aromatic material.

According to one or more embodiments, the fastener is configured for extending into a floor drain skirt that is engaged with the drain assembly.

According to one or more embodiments, a drain cover assembly for a floor drain assembly is provided. The drain cover assembly includes a drain cover skirt configured for being engaged with the floor drain, a skirt material defining a plurality of openings therein for allowing flowthrough of liquid, and one or more fasteners extending from the first skirt material and configured for being engagably received by one of the drain assembly and the drain cover skirt.

According to one or more embodiments, the one or more fasteners are each pegs extending from the first skirt material.

According to one or more embodiments, the one or more pegs include one or more detents for being received in cooperatively defined one or more openings of a skirt in the drain assembly.

According to one or more embodiments, the skirt material is formed from an injection molding process.

According to one or more embodiments, the injection molding process includes injecting an aromatic material into the skirt material.

According to one or more embodiments, the injection molding process includes injecting a treatment material into the skirt material.

According to one or more embodiments, the skirt material is provided with an aromatic material.

According to one or more embodiments, the fastener is configured for extending into the floor drain skirt that is engaged with the drain assembly.

According to one or more embodiments, a cover for a floor drain is provided. The cover includes a first skirt material defining a cutout therein. The skirt material is configured for covering the perimeter of the floor drain. A second skirt material for being received in the cutout and is configured for covering the opening of the floor drain. The second skirt material further defines an opening therein for receivably engaging a basket assembly.

According to one or more embodiments, the cover is formed from an injection molding process.

According to one or more embodiments, the injection molding process includes injecting an aromatic material into the cover.

According to one or more embodiments, the cover is provided with a treatment material.

According to one or more embodiments, the first skirt material defines a generally square shaped panel for engaging with the floor drain.

According to one or more embodiments, the first skirt material defines a plurality of openings therein for allowing flowthrough of liquids.

According to one or more embodiments, the second skirt material defines a plurality of openings therein for allowing flowthrough of liquids.

According to one or more embodiments, the second skirt material defines a groove that is configured for receiving a snap arm of the basket assembly.

According to one or more embodiments, the second skirt material defines a ledge upon which the basket assembly rests when selectively engaged therewith.

According to one or more embodiments, a kit for use with a floor drain assembly is provided. The kit includes a cover for a floor drain. The cover includes a first skirt material defining a cutout therein. The skirt material is configured for covering the perimeter of the floor drain. A second skirt material for being received in the cutout and being configured for covering the opening of the floor drain is provided. The second skirt material further defines an opening therein for receivably engaging a basket assembly. A basket assembly configured for containing a liquid-soluble treatment material therein and being configured to be received in the opening defined in the second skirt material is provided.

According to one or more embodiments, the basket assembly further defines a shoulder configured for engaging with a cooperative groove formed in the skirt.

According to one or more embodiments, the basket assembly further defines an arm configured for engaging with a cooperative groove formed in the skirt.

According to one or more embodiments, the basket assembly further defines a support to which the liquid-soluble treatment material is carried by.

According to one or more embodiments, the basket assembly defines a plurality of openings on a top portion thereof for allowing flow-through of liquid.

According to one or more embodiments, the first skirt material defines a plurality of openings for allowing flowthrough of liquid.

According to one or more embodiments, the second skirt material defines a ledge upon which the basket assembly rests when selectively engaged therewith.

According to one or more embodiments, the kit further includes liquid-soluble material carried within the basket assembly. The liquid-soluble material is configured as one of a pesticide, insecticide, fragrance, and a degreaser.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Further, the claimed subject matter is not limited to implementations that solve any or all disadvantages noted in any part of this disclosure.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings:

FIG. 5 is a side view of a device for use with a drain in which a basket assembly of the device is shown spaced-apart from the drain according to one or more embodiments disclosed herein;

FIG. 6 is a side view of a device for use with a drain according to one or more embodiments disclosed herein;

FIG. 7 is a side view of a device for use with a drain according to one or more embodiments disclosed herein;

FIG. 14 is a perspective view of a device for use with a drain according to one or more embodiments disclosed herein;

FIG. 15 is an exploded view of a device for use with a drain according to one or more embodiments disclosed herein;

FIG. 16D is a top view of a device for use with a drain according to one or more embodiments disclosed herein;

FIG. 16E is a bottom view of a device for use with a drain according to one or more embodiments disclosed herein;

FIG. 16F is a side view of a device for use with a drain according to one or more embodiments disclosed herein;

FIG. 16G is a side view of a device for use with a drain according to one or more embodiments disclosed herein;

FIG. 16H is a top facing perspective view of a device for use with a drain according to one or more embodiments disclosed herein;

FIG. 16I is a bottom facing perspective view of a device for use with a drain according to one or more embodiments disclosed herein;

DETAILED DESCRIPTION

Figure 1:
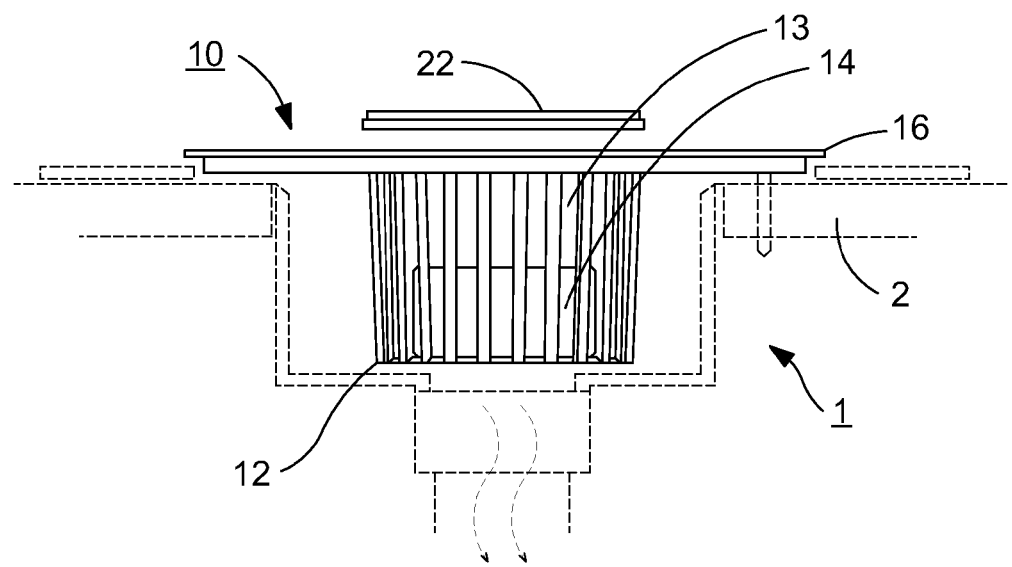
FIG. 1 is a side view of a device for use with a drain and being installed therewith according to one or more embodiments disclosed herein.
Figure 2:
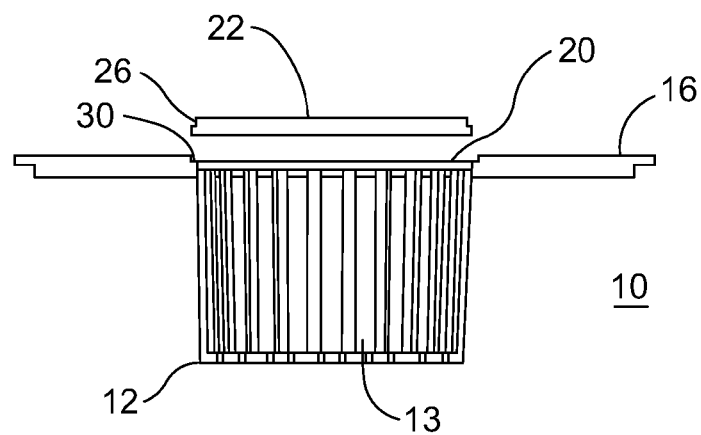
FIG. 2 is a side view of a device for use with a drain according to one or more embodiments disclosed herein.
Figure 3:
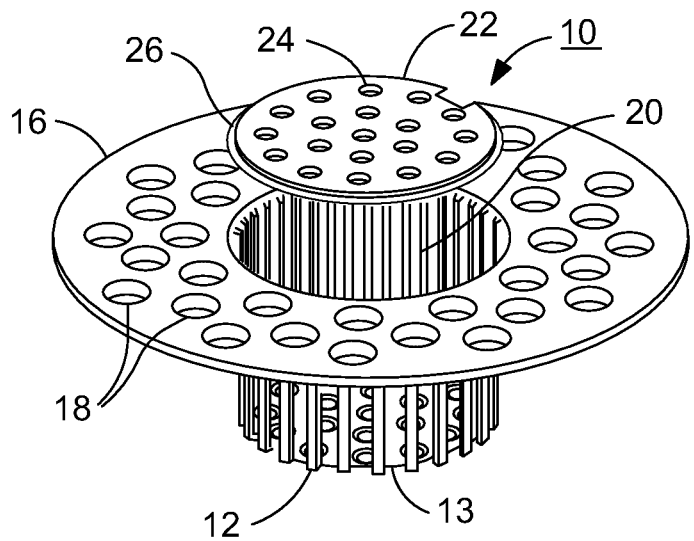
FIG. 3 is a perspective view of a device for use with a drain according to one or more embodiments disclosed herein.
Figure 4:
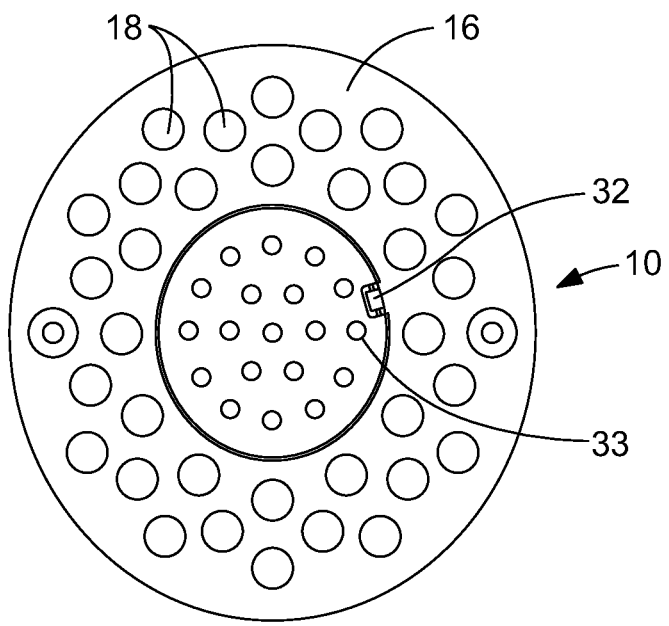
FIG. 4 is a top view of a device for use with a drain according to one or more embodiments disclosed herein.

The presently disclosed subject matter now will be described more fully hereinafter with reference to the accompanying drawings, in which some, but not all embodiments are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

A device for use with a drain is illustrated in FIGS. 1 through 4 and is generally designated 10. The device 10 is configured for being received within a floor drain 1. The device includes a basket assembly 12 containing a treatment material 14 therein. As used herein, basket assembly may refer to any assembly, device, or structure capable of carrying or containing a treatment material. The treatment material 14 may be a generally solid or liquid material. Additionally, the treatment material 14 may be a liquid-soluble material configured to release aromatic treatment when dissolved or dissipated with liquid. As used herein, liquid-soluble includes any material in which the passage-by or pass-through of liquid causes some material change or reaction to occur. For example, liquid-soluble may refer to a material that is at least liquid-dispersible. Furthermore, liquid-soluble may also describe the condition in which the liquid that passes by or through the aromatic material carries the dissolved liquid-soluble material. The treatment material 14 may contain anti-bacterial or other sanitizing characteristics. The treatment material 14 may be a bacterial or enzyme treatment that is configured for destroying odor-causing microorganisms and the like that may be found in drains. The treatment material 14 may include a bioactive agent that produces enzymes that digest collected grease and oil. The treatment material 14 may include materials that are insecticidal in nature and repel and kill insects. In other embodiments, the basket assembly 12 may contain some medium that may or may not be liquid-soluble, including, for example, a sponge soaked in an appropriate chemical. In other embodiments, the treatment material 14 may be a liquid-soluble treatment material configured to emit a desired aroma when liquid flows about the material. The basket assembly 12 may include a plurality of openings 13, such as, for example the slots shown throughout the drawings. The basket assembly 12 may be generally concentric with the drain opening 3 when installed thereon. The treatment material 14 is configured such that when liquid, which may be liquid waste-water, grease, oil, or any other liquid that is poured down a drain, passes into the openings 13 and through the treatment material 14, the treatment material 14 releases an aroma to mask any odor emanating from the drain 1.

The device 10 includes a drain cover skirt 16. The drain cover skirt 16 may define an opening 20 that receives and carries the basket assembly 12. In this manner, the drain cover skirt 16 and basket assembly 12 may be integrally formed. The drain cover skirt 16 may further define a plurality of openings 18 that allow flow of liquid therethrough. A basket assembly lid 22 is provided for engaging with the opening 20. The basket assembly lid 22 defines at least one aperture 24 for allowing flow of liquid into the basket assembly 12. The basket assembly 12 may include a flange 26 for cooperatively engaging a recess 30 that is defined in the drain cover skirt 16 to thereby engage the lid 22 with the drain cover skirt 16.

The basket assembly lid 22 may be further configured for engagement with the drain cover skirt 16 by other appropriate manners. For example, a hook 32 carried by the drain cover skirt 16 may be further configured for engaging the flange 26 and extending into a recess 33 defined in the lid 22. The hook 32 may be configured for rotatable movement or pivotable movement about the drain cover skirt 16 such that the hook 32 can be selectively engaged therewith. The hook 32 may be rotated or pivoted out of the way by inserting an elongate object such as a screwdriver or blade into the gap defined between the hook 32 and basket lid 22 and pressing the hook 32 into an unobstructed position.

Installation of the device 10 is accomplished by fastening the drain cover skirt 16 to a supporting floor surface 2. The drain 1 should be aligned with the opening 20 of the drain cover skirt 16 such that the basket assembly 12 may be received within the drain 1. The drain cover skirt 16 may be fastened to the supporting floor surface 2 by the use of a threaded fastener, such as a screw, though in other embodiments, any appropriate fastener may be used. The treatment material 14 is then placed into the basket assembly 12. The treatment material 14 may occupy substantially all or only a portion of the basket assembly 12 when installed. The lid 22 is then engaged with the drain cover skirt 16. In the one or more embodiments illustrated in FIG. 1, this is accomplished by engaging the flange 26 with the recess 30. In the one or more embodiments of FIG. 4, this may include rotating or pivoting the hook 32 until the flange 26 is in engagement therewith. To replace a spent treatment material 14, the lid 22 is disengaged from the drain cover skirt 16, the treatment material 14 is replaced, and the lid 22 is then re-engaged with the drain cover skirt 16.

A device according to one or more embodiments is illustrated in FIGS. 5 through 8 and is generally designated 110. The device 110 is similar in many respects to the device 10 illustrated in FIGS. 1 through 4 and shares many of the same aspects. The device is configured for being received within a floor drain 1.

The device 110 also includes a drain cover skirt 116. The drain cover skirt 116 may define an opening 120 that receives a basket assembly 112. The drain cover skirt 116 may further define a plurality of openings 118 that allow flow of liquid therethrough. The basket assembly 112 may contain treatment material 14 therein. Alternatively, any desired material may be placed in the basket assembly 112. The basket assembly 112 may include a plurality of openings 113, such as, for example, the slots shown throughout the drawings. The plurality of openings 113 allow liquid to, flow there-through and into the drain 1. A basket assembly lid 122 is provided for engaging with the opening 120 and is carried by the basket assembly 112. The basket assembly lid 122 may define at least one aperture 124 for allowing flow of liquid into the basket assembly 112. The basket assembly 112 may include a flange 126 for cooperatively engaging a recess 130 that is defined in the drain cover skirt 116 to thereby engage the lid 122 and the basket assembly 112 with the drain cover skirt 116.

The one or more embodiments illustrated in FIGS. 5 through 8 may differ from the one or more embodiments illustrated in FIGS. 1 through 4 in that the basket assembly 112 may be replaced when the treatment material or other material contained therein needs replacing.

The basket assembly 122 may be further configured for engagement with the drain cover skirt 116 by other appropriate manners. For example, a hook 132 carried by the drain cover skirt 116 may be further configured for engaging the flange 126 and extending into a recess 133 defined in the lid 122. The hook 132 may be configured for rotatable movement or pivotable movement about the drain cover skirt 116 such that the hook 132 can be selectively engaged. The hook 132 may be rotated or pivoted out of the way by inserting an elongate object such as a screwdriver or blade into the gap defined between the hook 132 and basket lid 122 and pressing the hook 132 into an unobstructed position.

Installation of the device 110 is accomplished by fastening the drain cover skirt 116 to a supporting floor surface 2 as illustrated in FIG. 5. The drain 1 should be aligned with the opening 120 of the drain cover skirt 116 such that the basket assembly 112 may be received within the drain 1. The drain cover skirt 116 may be fastened to the supporting floor surface 2 by the use of a threaded fastener, such as a screw, though in other embodiments, any appropriate fastener may be used. The treatment material may occupy substantially all or only a portion of the basket assembly 112 when installed. The basket assembly 112 is then lowered into the drain 1 until the lid 122 is in general alignment with the drain cover skirt 116. The lid 122 is then engaged with the drain cover skirt 116 by engaging the flange 126 of the lid 122 with the recess 130 of the cover skirt 116 thereby securing the basket assembly 112 into the drain 1. This may be accomplished by bending or flexing of the basket 122 until the flange 126 can be engaged in the recess 1230. In the one or more embodiments illustrated in FIG. 8, this may include rotating or pivoting the hook 132 until the flange 126 is in engagement therewith.

The basket assemblies 12 and 112 are shown as having a generally cylindrical or frusto-conical shape, though in one or more embodiments, may have a specially configured shape. In this manner, only similarly shaped treatment material could be placed in the basket assemblies 12 and 112. For example, the basket assemblies 12 and 112 could have an "A" or "V" shape. In this example, the treatment material would need to have a corresponding "A" or "V" shape in order to be placed into the basket assemblies 12 and 112. This may be important to ensure that proper and authorized treatment materials are utilized with the devices disclosed herein.

Figure 9:
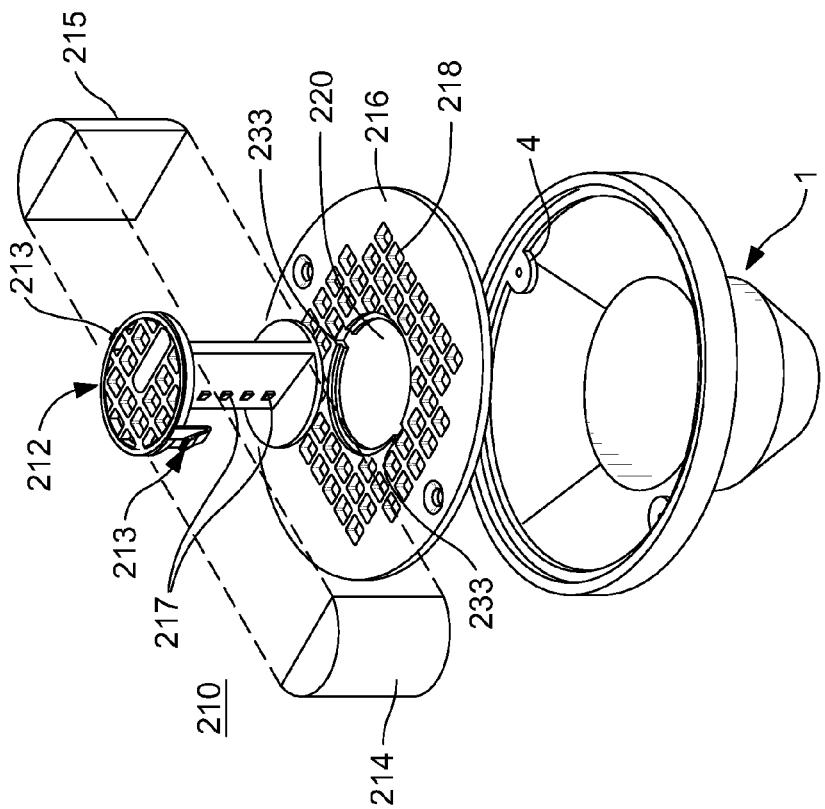
FIG. 9 is an exploded view of a device for use with a drain according to one or more embodiments disclosed herein.
Figure 8:
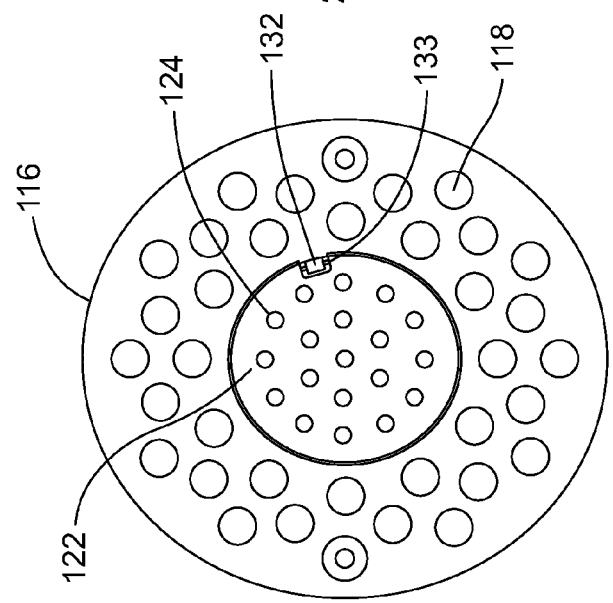
FIG. 8 is a top view of a device for use with a drain according to one or more embodiments disclosed herein.

One or more embodiments sharing many features and elements as the one or more embodiments illustrated in FIGS. 1 through 8 are illustrated in FIGS. 9 through 15. As illustrated in FIG. 9, the device 210 may include an assembly 212 containing a first material 214 and a second material 215 that is adhered thereto. In one or more embodiments, the first material 214 may be an aromatic material and the second material 215 may be a pesticide material. In one or more embodiments, one of the first material 214 and the second material 215 may also include a degreaser for aiding in preventing drain clogs. The portion of the assembly 212 may include a plurality of catches 217 that are configured for aiding in adhering the first material 214 and the second material 215 thereto. The assembly 212 is configured for being received within an opening 220 of a drain cover skirt 216. The drain cover skirt 216 may include one or more apertures 218 that allow flow-through of liquid into the drain assembly 1. The drain assembly 1 may include a tab 4 that is configured for receiving a threaded fastener for securing the drain cover skirt 216 thereto. The assembly 212 may include a snap arm assembly 213 that is configured for allowing placement of the assembly 213 into the opening 220 and engaging a slot 233 formed in the drain cover skirt 216. Removal of the assembly 212 is effectuated by pressing the snap assemblies 213 inward so that that the assemblies 213 are no longer in interference with the drain cover skirt 216. Subsequent pulling upward on the assembly 212 until assembly 212 is no longer in engagement with the drain cover skirt 216 completes removal.

Figure 10:
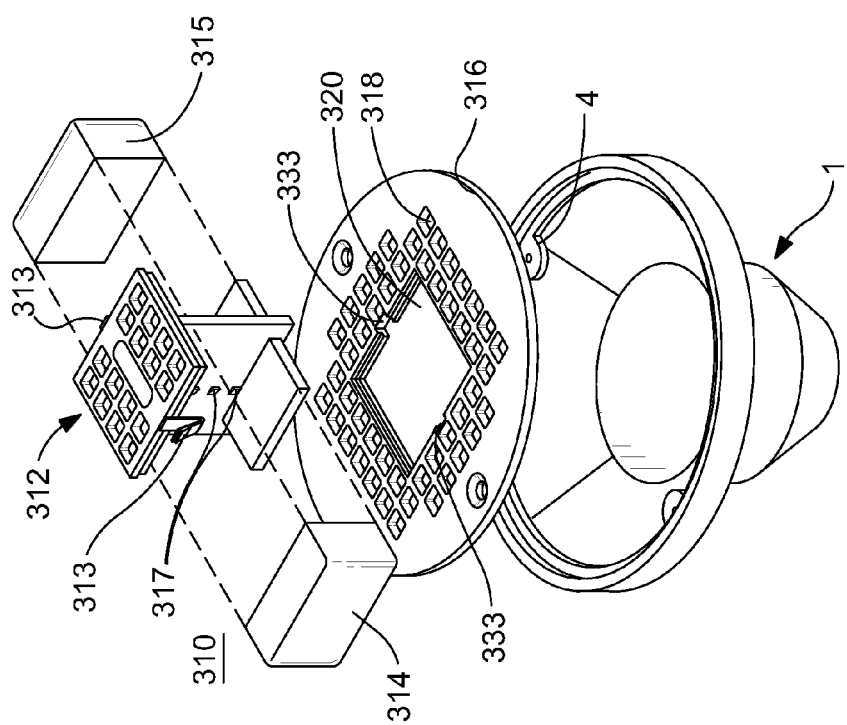
FIG. 10 is an exploded view of a device for use with a drain according to one or more embodiments disclosed herein.

As illustrated in FIG. 10, a device 310 may include an assembly 312 containing a first material 314 and a second material 315 that is adhered to a portion of the assembly 312. Each of the first material 314 and second material 315 may be one of any desired material, including an aromatic material, a pesticide, a degreasing material, an enzyme material, and the like. One or more catches 317 may be provided for engaging with the first material 314 and second material 315. The assembly 312 is configured for being received within an opening 320 of a drain cover skirt 316. The drain cover skirt 316 may include one or more apertures 318 that allow flow-through of liquid into the drain assembly 1. The assembly 312 may include a snap arm assembly 313 that is configured for allowing placement of the assembly 312 into the opening 320 and engaging a slot 333 formed in the drain cover skirt 316. Removal of the assembly 312 is effectuated by pressing the snap assemblies 313 inward so that that are no longer in interference with the drain cover skirt 316 and pulling upward on the assembly 312 until the assembly 312 is no longer in engagement with the drain cover skirt 316.

Figure 11:
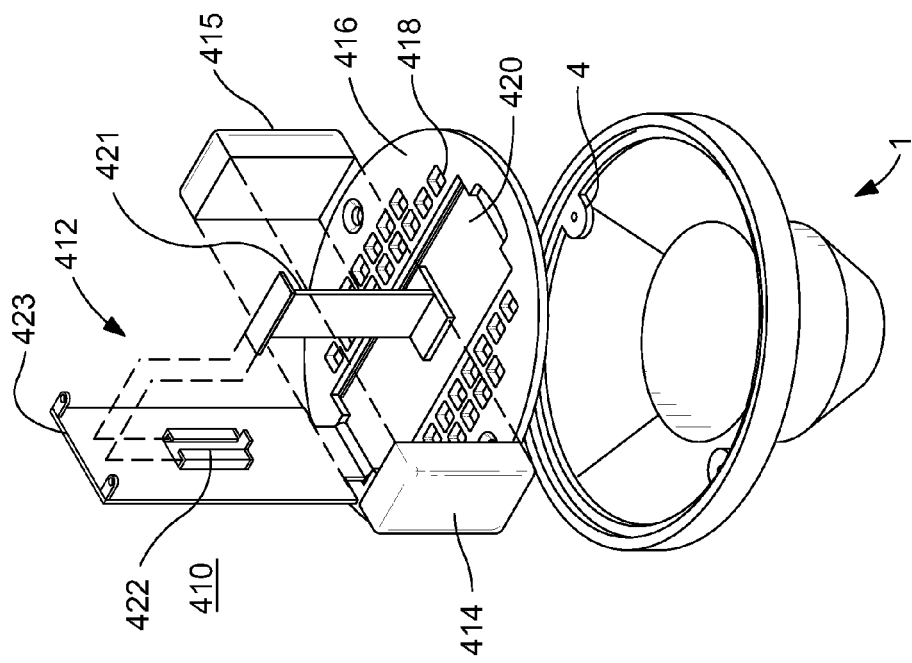
FIG. 11 is an exploded view of a device for use with a drain according to one or more embodiments disclosed herein.

As illustrated in FIG. 11, a device 410 for use with a drain 1 is provided. The device 410 may include an assembly 412 containing a first treatment material 414 and a second treatment material 415 that is adhered to a portion of the assembly 412. Each of the first material 414 and second material 415 may be one of any desired material, including an aromatic material, a pesticide, a degreasing material, an enzyme material, and the like. The assembly 412 is configured for being received within an opening 420 of the drain cover skirt 416. The drain cover skirt 416 may include one or more apertures 418 that allow flow-through of liquid into the drain assembly 1. The assembly 412 may include a shoulder assembly 421 that is configured for being received within a slot 422 defined by a panel 423 hingedly connected to the drain cover skirt 416. In this manner, removal of the shoulder assembly 421, first material 414, and second material 415 is carried out by rotating the panel 423 away from the drain cover skirt 416, and sliding the shoulder assembly 421 away from the slot 422. Installation and replacement of a spent first material 414 and second material 415 is accomplished by replacing the shoulder assembly 421 having an unspent first material 414 and second material 415 carried thereby with an unspent shoulder assembly.

Figure 12:
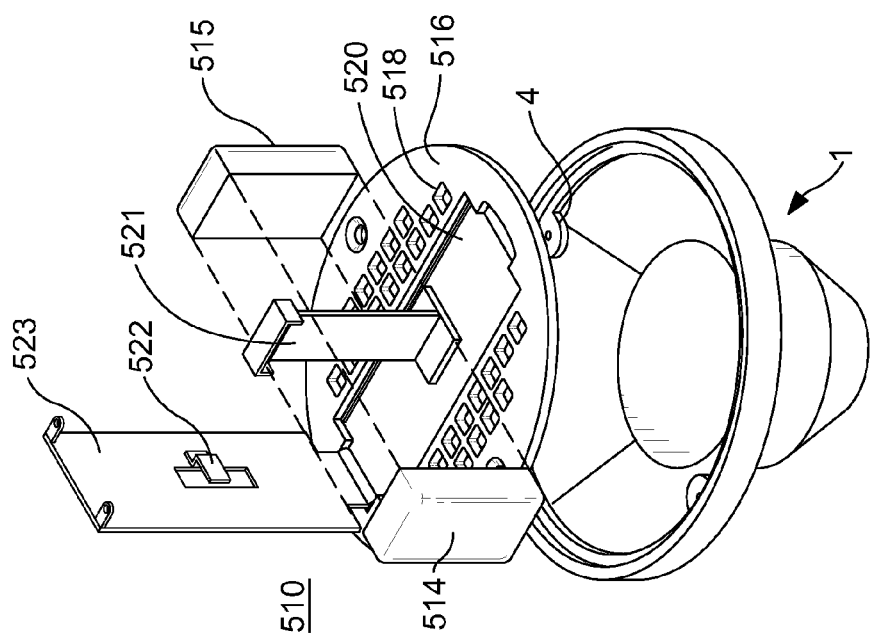
FIG. 12 is an exploded view of a device for use with a drain according to one or more embodiments disclosed herein.

As illustrated in FIG. 12, a device 510 for use with a drain 1 is provided. The device 510 may include an assembly 512 containing a first material 514 and a second material 515 that is adhered to a portion of the assembly 512. Each of the first material 515 and second material 515 may be one of any desired material, including an aromatic material, a pesticide, a degreasing material, enzyme material, and the like. The assembly 512 is configured for being received within an opening 520 of the drain cover skirt 516. The drain cover skirt 516 may include one or more apertures 518 that allow flow-through of liquid into the drain assembly 1. The assembly 512 may include a shoulder assembly 521 that is configured for being received within a slot 522 carried by a panel 523 hingedly connected to the drain cover skirt 516. In this manner, removal of the shoulder assembly 521, first material 515, and second material 515 is carried out by rotating the panel 523 away from the drain cover skirt 516, and sliding the shoulder assembly 521 away from the slot 522. Installation and replacement of a spent first material 515 and second material 515 is accomplished by replacing the shoulder assembly 521 with a shoulder assembly 521 having unspent first material 515 and second material 515. The panel 523 may be configured to close against and engage the cover skirt 516 by any appropriate manner, including fasteners, detents, and the like.

Figure 13:
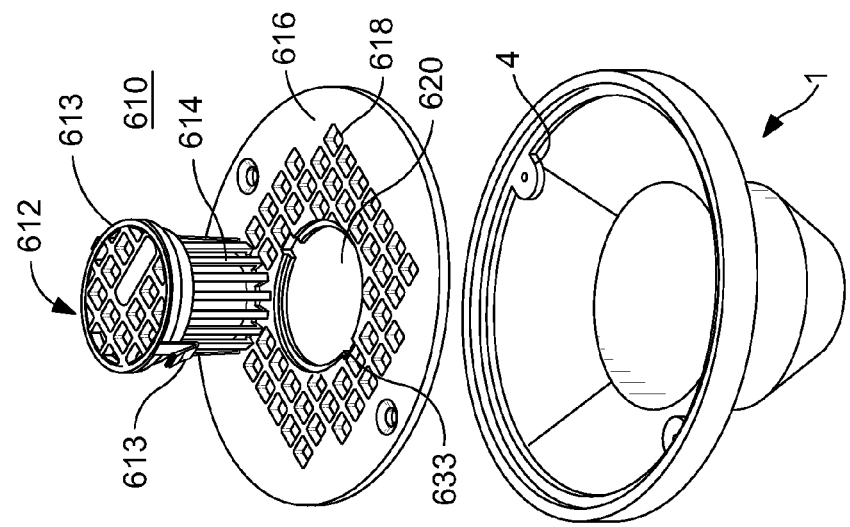
FIG. 13 is a perspective view of a device for use with a drain according to one or more embodiments disclosed herein.

As illustrated in FIG. 13, a device 610 for use with a floor drain 1 is provided. The device 610 may include a basket assembly 612 containing a material therein. The material 614 may be one of an aromatic material, pesticide material, degreaser material, enzyme material, and the like. The basket assembly 612 is configured for being received within an opening 620 of the drain cover skirt 616. The drain cover skirt 616 may include one or more apertures 618 that allow flow-through of liquid into the drain assembly 1. The basket assembly 612 may include a snap arm assembly 613 that is configured for allowing placement of the basket assembly 612 into the opening 620 and engaging a slot 633 formed in the drain cover skirt 616. Removal of the basket assembly 612 is effectuated by pressing the snap assemblies 613 inward so that that are no longer in interference with the drain cover skirt 616 and pulling upward on the basket assembly 612 until no longer in engagement with the drain cover skirt 616.

As illustrated in FIG. 14, a device 710 for use with a floor drain 1 is provided. The device 710 may include a basket assembly 712 containing a material therein. The material 714 may be one of an aromatic material, pesticide material, degreaser material, enzyme material, and the like. The basket assembly 712 is configured for being received within an opening 720 of the drain cover skirt 716. The drain cover skirt 716 may include one or more apertures 718 that allow flow-through of liquid into the drain assembly 1. The basket assembly 712 may include a snap arm assembly 713 that is configured for allowing placement of the basket assembly 712 into the opening 720 and engaging a slot 733 formed in the drain cover skirt 716. Removal of the basket assembly 712 is effectuated by pressing the snap assemblies 713 inward so that that are no longer in interference with the drain cover skirt 717 and pulling upward on the basket assembly 712 until no longer in engagement with the drain cover skirt 716.

As illustrated in FIG. 15, a device 810 for use with a floor drain 1 is provided. In FIG. 15, the device 810 is shown in a cross-sectional view. The device 810 may include a basket assembly 812 that includes a first vessel 840 and a second vessel 842. Each of the first vessel 840 and second vessel 842 may contain a material therein, and may include the same or different materials. The material may be one of an aromatic material, pesticide material, degreaser material, enzyme material, and the like. The basket assembly 812 is configured for being received within an opening 820 of the drain cover skirt 816. The drain cover skirt 816 may include one or more apertures 818 that allow flow-through of liquid into the drain assembly 1. The basket assembly 812 may include a snap arm assembly 813 that is configured for allowing placement of the basket assembly 812 into the opening 820 and engaging a slot 833 formed in the drain cover skirt 816. Removal of the basket assembly 812 is effectuated by pressing the snap assemblies 813 inward so that that are no longer in interference with the drain cover skirt 816 and pulling upward on the basket assembly 812 until no longer in engagement with the drain cover skirt 816. A support 844 may be provided that spans across the drain cover opening 820 for providing support to the drain cover skirt 816. In this manner, the support 844 may be provided such that the portion of the basket assembly 812 defined about the intersection of the first vessel 840 and the second vessel 842 rests thereon when the basket 812 is installed within the drain cover skirt 816.

In one or more embodiments, the one or more devices disclosed herein may provide for a lid or base portion of the basket assembly that may be selectively removable such that the treatment material may be replaced. Alternatively, the basket assembly may be integrally formed such that only by replacing the basket assembly that has new treatment material therein can the basket be "refilled." In one or more embodiments, the basket assembly may also take on a two-part assembly such that the basket assembly may be selectively disassembled at about any of a medial portion thereof.

Additionally, in one or more embodiments, the one or more basket assemblies disclosed herein have been illustrated with a fastener extending therefrom. In one or more embodiments, the skirt cover may define a fastener for engaging with the one or more basket assemblies.

Figure 16A:
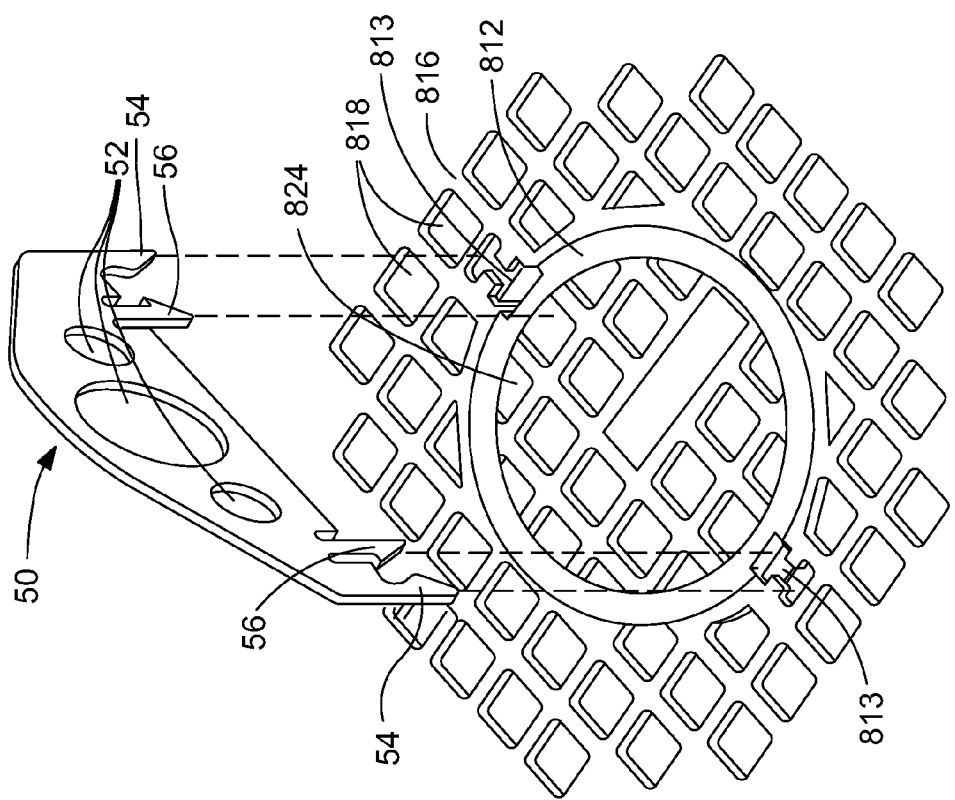
FIG. 16A is a perspective view of a tool for use with a drain, the tool being provided for removal of the device according to one or more embodiments disclosed herein.
Figure 16C:
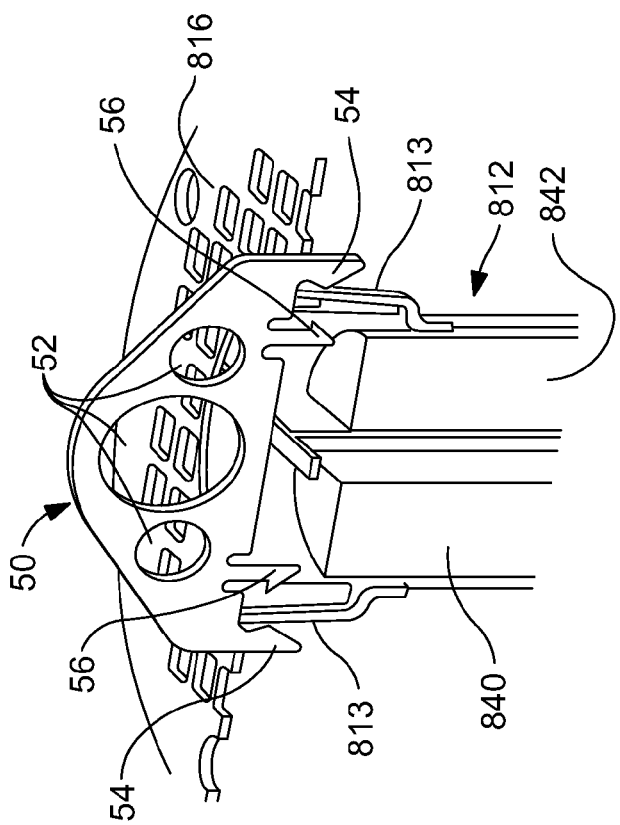
FIG. 16C is a perspective cross-sectional view of the tool of FIG. 16A according to one or more embodiments disclosed herein.
Figure 16B:
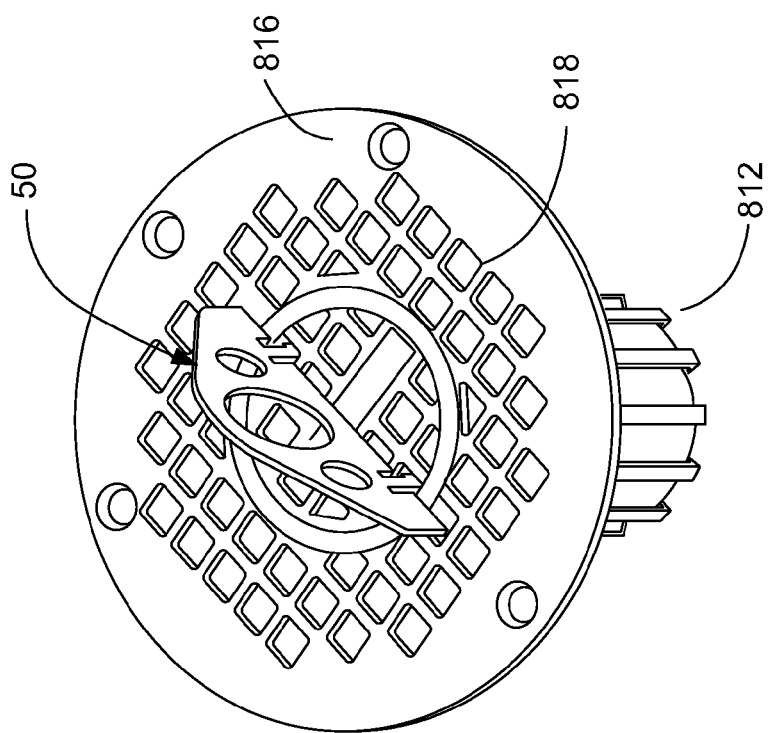
FIG. 16B is a perspective view of a tool installed on a device for use with a drain, the tool being provided for removal of the device according to one or more embodiments disclosed herein.

As illustrated in FIGS. 16A, 16B, and 16C, a tool 50 may be provided for engaging with any of the basket assemblies and snap arm assemblies disclosed herein. For purposes of illustration only, the tool 50 is shown interacting with basket assembly 812 and snap arm assembly 813. The tool 50 is configured for moving the snap arm assembly 813 from a first position in which the arm assembly 813 is in engagement with the drain cover skirt 818 and a second position in which the arm assembly 813 is free of the drain cover skirt 818. The tool 50 may include one or more openings 52 that may be provided for receiving an operator's fingers. Additionally, the tool 50 may include shoulders 54 that are configured for extending into the drain cover assembly 818 through openings 824 and engaging the snap arm assembly 813 to move the assembly from the first position in which the snap arm assembly 813 is in engagement with the drain cover skirt 818 and a second position in which the snap arm assembly 813 is free of the drain cover skirt 818. One or more hooks 56 may also be provided for extending into and engaging the basket assembly 812. In this manner, the hooks 56 will pull upward on the basket assembly 812 when the operator pulls the tool 50 upwards away from the drain. The tool 50 may be sufficiently resilient such that any bending, flexing, or other resiliency necessary for the tool to operate is provided. The tool may define planar nesting surface 58 that is configured for nesting with a top portion of the basket assembly 812. The tool 50 may be provided with the one or more devices disclosed herein as a kit.

FIGS. 16D, 16E, 16F, 16G, 16H, and 16I illustrated one or more additional views of device 810.

Figure 17:
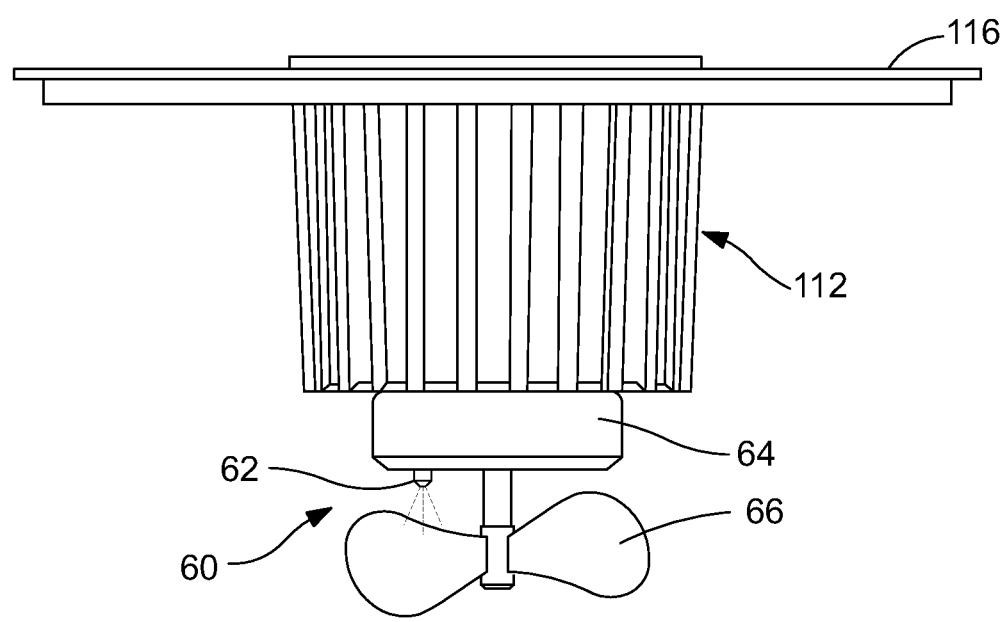
FIG. 17 is a side view of a device for use with a drain according to one or more embodiments disclosed herein.

One or more embodiments of a device for use with a floor drain are illustrated in FIG. 17 in which an apparatus 60 is provided for engagement with the one or more basket assemblies disclosed herein. For purposes of illustration only, the basket assembly is illustrated as basket assembly 112. The apparatus 60 includes a fluid spraying device 62, such as a mister. A housing 64 may define a chamber for holding appropriate fluid to be sprayed, such as an aromatic material. A fan 66 may be provided extending from the housing for providing air movement of the fluid being sprayed. A battery or other energy storage may be additionally provided for powering the fan 66.

Figure 18:
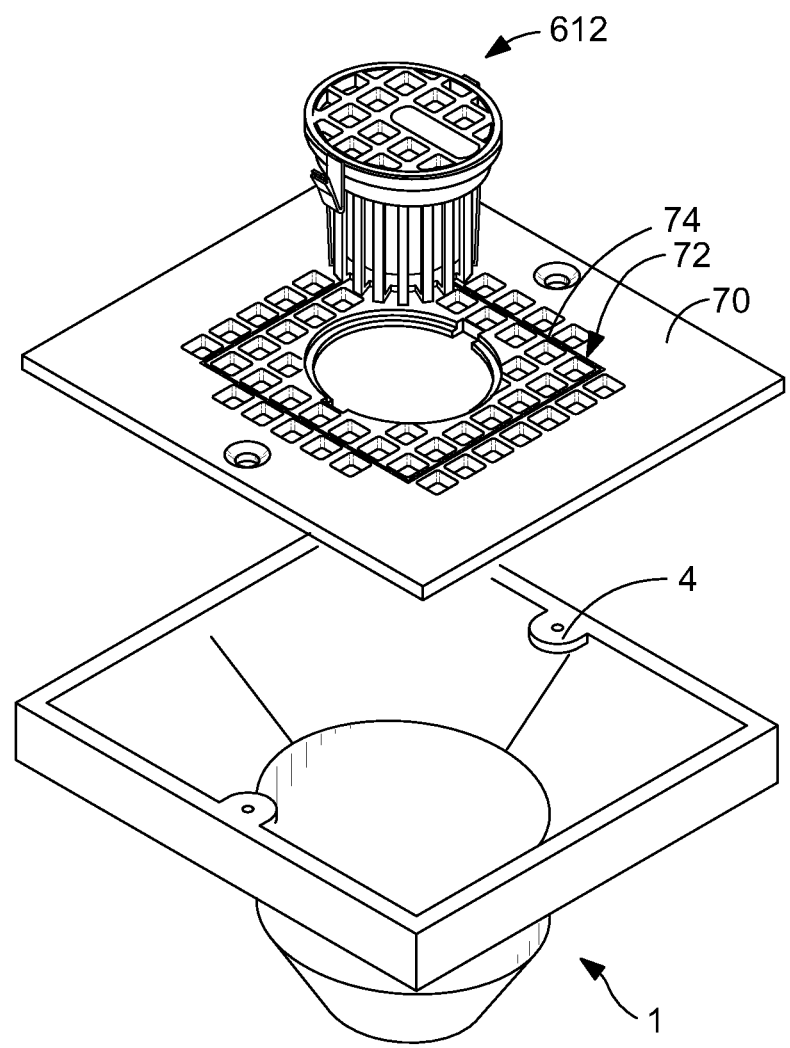
FIG. 18 is an exploded perspective view of a device for use with a drain according to one or more embodiments disclosed herein.

One or more alternate embodiments of a device for use with a floor drain are illustrated in FIG. 18 in which an adaptor cover skirt 70 having a first skirt material is provided for use with the one or more basket assemblies disclosed herein. For purposes of illustration only, the basket assembly is illustrated as basket assembly 612. The adaptor skirt 70 is provided for using square shaped drain assemblies as illustrated in FIG. 18 with the one or more basket assemblies disclosed herein. The adaptor skirt 70 defines a void or cutout 72, which may be a square as illustrated in FIG. 18. The void 72 is configured for receiving a skirt cover plate 74 that defines a second skirt material. The skirt cover plate 74 defines an opening therein for receiving the basket assembly 612. The skirt cover plate 74 is configured, along with adaptor skirt 70, to have varying sizes in order to accommodate drains of varying sizes, shapes, and configurations.

Figure 19A:
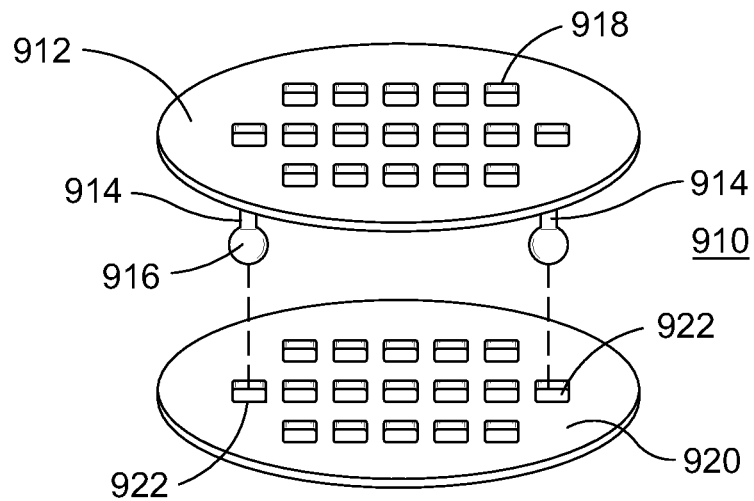
FIG. 19A is an exploded perspective view of a device for use with a drain according to one or more embodiments disclosed herein.
Figure 19B:
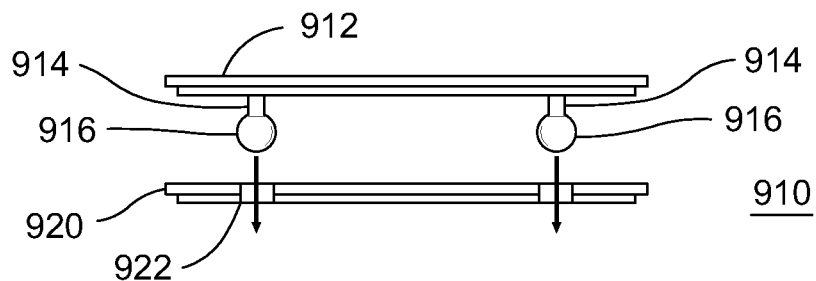
FIG. 19B is a side view of a device for use with a drain according to one or more embodiments disclosed herein.
Figure 19C:
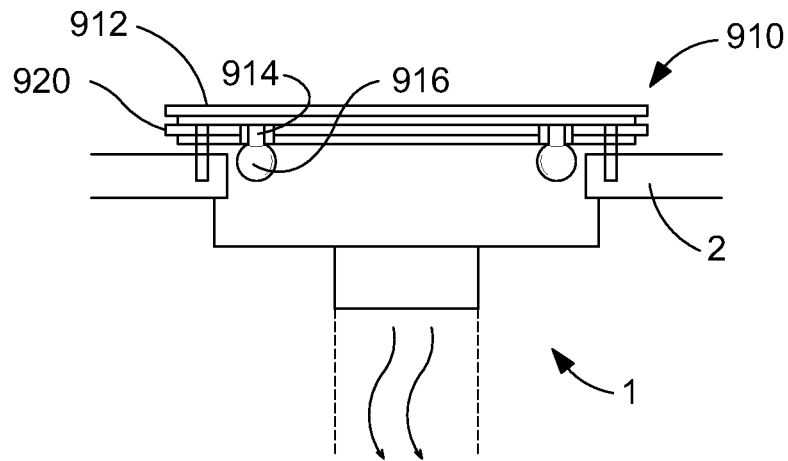
FIG. 19C is a side view of a device installed about a drain according to one or more embodiments disclosed herein.

One or more devices are illustrated in FIG. 19A, FIG. 19B, and FIG. 19C that are configured for being used with a drain assembly according to one or more embodiments disclosed herein. The one or more devices are generally depicted as 910. The device 910 includes an insert cover skirt 912 that has one or more fasteners, illustrated as pegs 914 in FIGS. 19A, 19B, and 19C, extending therefrom. The one or more pegs 914 may include one or more detents 916 on an end thereof. The insert cover 912 may include one or more openings 918 for allowing from through of liquid. The insert cover 912 is configured for being received by a conventional drain skirt, illustrated as 920. The pegs 914 are configured for extending into openings 922 defined in the conventional drain skirt such that the insert cover can nestably engage with the conventional drain skirt 920. The detents 916 may be provided for maintaining the insert cover 912 with the drain skirt 920 and may be formed from a resilient material for releasable engagement as desired by the operator.

In one or more embodiments disclosed herein, the insert cover 912 may be fabricated with an injection molding process that includes injecting fragrance, aromatic material, or other desired material into the molding material. In this manner, the insert cover 912 may have a pleasing fragrance and may be installed as shown in FIG. 19C to mask odors emanating from the drain assembly 1.

In one or more embodiments disclosed herein, any of the devices herein may be fabricated with an injection molding process that includes injecting fragrance, aromatic material, or other desired material into the molding material. In this manner, the one or more devices herein may have a pleasing fragrance and may be installed to mask odors emanating from the drain assembly 1.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A device for providing treatment to a drain, comprising:
a skirt configured for being engaged about a drain having a drain collar that engages with the floor and having an opening through which liquids flow and further defining a recess to which a threaded fastener is configured to extend into;
a first basket assembly extending into the opening when the device is installed about the drain and that contains a treatment material therein and defines one or more drainage apertures along a partial circumference thereof; and
a second basket assembly extending into the opening when the device is installed about the drain,
wherein the skirt defines a pair of notches that are configured for receiving a pair of tabs that engage the lid about the opening.

2. The device according to claim 1, wherein the first basket assembly defines a cross section that generally corresponds to a cross section of the second basket assembly.

3. The device according to claim 1, wherein a gap is defined between the first basket assembly and the second basket assembly when the device is installed about the drain.

4. The device according to claim 1, wherein the skirt defines an opening to which a lid is selectively engaged with.

5. The device according to claim 4, wherein the lid has a thickness that extends from a top of the basket on a bottom facing surface of the lid to a top of the skirt on a top facing surface of the lid when the lid is engaged with the skirt.

6. The device according to claim 1, wherein the first and second basket assemblies are engaged together when the device is installed about the drain.

7. The device according to claim 1, wherein at least one of the first basket assembly and the second basket assembly extend from the skirt.

8. The device according to claim 1, wherein the lid and skirt define a generally flat upper surface when the lid is engaged with the skirt.

9. The device according to claim 1, wherein the basket defines a flange that engages with the skirt about the opening.

10. The device according to claim 9, wherein the flange extends about at least a partial circumference of the basket.

11. The device according to claim 1, wherein each of the pair of tabs does not extend above the lid when the device is installed within the opening.

12. The device according to claim 1, wherein the first and second basket assemblies each define a plurality of drainage openings extending along a length of the circumference thereof.

13. A drain assembly comprising:
   a drain having a drain collar surrounding a drain opening and that engages with a floor and having a shoulder extending away from the collar in a direction away from the floor and further defining an inwardly facing tab that defines a recess for receiving a threaded fastener; and
   a device comprising:
      a skirt configured for extending around an inner periphery of the shoulder when installed, the skirt defining an aperture through which a fastener extends into and in engagement with the recess of the drain and in which the fastener does not extend through the floor, the skirt further defining an opening through which a lid engages; and
      a treatment material holder positioned between the lid and the drain opening.

14. The device according to claim 13, wherein the treatment material holder defines an outwardly extending flange at a top portion thereof and the skirt defines a pair of opposing, inwardly facing members that engage the outwardly extending flange for suspending the treatment material holder.

15. The device according to claim 13, wherein the treatment material holder is a basket assembly.

16. The device according to claim 13, wherein the skirt defines a pair of notches that are configured for receiving a pair of tabs carried by the lid for engaging the lid to the skirt.

17. The device according to claim 13, wherein a portion of the treatment material holder extends into the drain opening when the device is installed about the drain.

* * * * *